(12) United States Patent
Coffey

(10) Patent No.: US 7,110,414 B2
(45) Date of Patent: Sep. 19, 2006

(54) CROSS-POINT SWITCH FOR A FIBER CHANNEL ARBITRATED LOOP

(75) Inventor: Aedan Diarmuid Cailean Coffey, Kilkenny (IE)

(73) Assignee: Richmount Computers Limited, Dublin (IE)

(*) Notice: Subject to any disclaimer, the term of this patent is extended or adjusted under 35 U.S.C. 154(b) by 800 days.

(21) Appl. No.: 09/915,612

(22) Filed: Jul. 26, 2001

(65) Prior Publication Data

US 2002/0044561 A1    Apr. 18, 2002

(30) Foreign Application Priority Data

Jul. 26, 2000 (IE) .............................. S2000/0599
Sep. 7, 2000 (IE) .............................. S2000/0711

(51) Int. Cl.
*H04L 12/56* (2006.01)
(52) U.S. Cl. ........................... 370/403; 371/461
(58) Field of Classification Search ........ 370/401–403, 370/434, 460, 461, 462, 463
See application file for complete search history.

(56) References Cited

U.S. PATENT DOCUMENTS

| | | | |
|---|---|---|---|
| 5,183,749 A | 2/1993 | Ramos et al. | |
| 5,313,369 A | 5/1994 | Lewis et al. | |
| 5,483,423 A | 1/1996 | Lewis et al. | |
| 5,790,782 A | 8/1998 | Martinez et al. | |
| 5,814,762 A | 9/1998 | Tusler et al. | |
| 5,892,973 A | 4/1999 | Martinez et al. | |
| 5,956,665 A | 9/1999 | Martinez et al. | |
| 6,050,658 A | 4/2000 | O'Sullivan et al. | |
| 6,061,244 A | 5/2000 | O'Sullivan et al. | |
| 6,115,814 A | 9/2000 | Lieber et al. | |
| 6,141,355 A * | 10/2000 | Palmer et al. | 370/465 |
| 6,185,203 B1 * | 2/2001 | Berman | 370/351 |
| 6,188,973 B1 | 2/2001 | Martinez et al. | |
| 6,367,033 B1 * | 4/2002 | Jibbe | 714/37 |
| 6,614,796 B1 * | 9/2003 | Black et al. | 370/403 |
| 6,658,504 B1 | 12/2003 | Lieber et al. | |
| 6,765,919 B1 * | 7/2004 | Banks et al. | 370/401 |
| 2002/0004342 A1 | 1/2002 | Mullins et al. | |
| 2002/0008427 A1 | 1/2002 | Mullins et al. | |
| 2002/0010883 A1 | 1/2002 | Coffey et al. | |
| 2002/0043877 A1 | 4/2002 | Mullins et al. | |
| 2002/0044562 A1 | 4/2002 | Killen, Jr. et al. | |
| 2002/0046276 A1 | 4/2002 | Coffey et al. | |
| 2002/0054477 A1 | 5/2002 | Coffey et al. | |
| 2002/0129182 A1 | 9/2002 | Coffey | |
| 2002/0129232 A1 | 9/2002 | Coffey | |
| 2002/0159311 A1 | 10/2002 | Coffey et al. | |
| 2003/0056048 A1 | 3/2003 | Mullins et al. | |

* cited by examiner

*Primary Examiner*—Ricky Q. Ngo
*Assistant Examiner*—Richard Chang
(74) *Attorney, Agent, or Firm*—Oppedahl & Olson LLP

(57) ABSTRACT

A hub for a fiber channel arbitrated loop is disclosed. The hub comprises a switching device including a matrix of switches connected by a plurality of signal lines, each signal line being electrically connected to at least one switch. The hub is operable to selectively connect and disconnect one signal line from at least one other signal line, at least some of the signal lines being operatively connectable to respective devices comprising the fiber-channel arbitrated loop. The switching device is operatively configurable to selectively open and close the switches to arrange the devices on the fiber-channel arbitrated loop.

3 Claims, 7 Drawing Sheets

CROSS-POINT SWITCH FOR A FIBER CHANNEL ARBITRATED LOOP

RELATED APPLICATIONS

The invention herein disclosed is related to co-pending application number S2000/0710 filed on Sep. 7, 2000 entitled "Fibre Channel Diagnostics in a Storage Enclosure" naming Aedan Diarmid Cailean Coffey et al as inventors; to co-pending application number S2000/0709 filed on Sep. 7, 2000 entitled "Performance Monitoring in a Storage Enclosure" naming Aedan Diarmid Cailean Coffey et al as inventors; and to co-pending application number S2000/0706 filed on Sep. 7, 2000 entitled "Data Gathering Device for a Rack Enclosure" naming Aedan Diarmid Cailean Coffey et al as inventors.

FIELD OF INVENTION

The present invention relates to a Cross-Point Switch for a Fibre-Channel Arbitrated Loop (FC-AL).

BACKGROUND OF INVENTION

Fibre Channel (FC) is a general name for an integrated set of standards being developed by ANSI (American National Standards Institute) whose purpose is to act as a universal high-speed interface for computers and mass storage. FC is a data transfer protocol that provides a highly reliable, gigabit interconnect technology that allows concurrent communications among workstations, mainframes, servers, data storage systems and other peripherals using Small Computer Systems Interface (SCSI) and Internet Protocol (IP) protocols. FC supports multiple topologies, including a Fibre Channel Arbitrated Loop (FC-AL), which can scale to a total system bandwidth on the order of a terabit per second.

From a logical point of view, an FC-AL is a single, continuous path composed of links and nodes, wherein each node has at least one port which can act as a transmitter, receiver or both. A Fibre Channel Arbitrated Loop (FC-AL) topology can be produced by simply connecting the transmit output portion of a node's port to receive input portion of another node's port, such connection existing between 3 or more devices in a daisy-chain formation. This connection arrangement allows a circular data path or loop to be created, but poses significant problems for trouble-shooting and adding or removing devices. In order to add a new device for example, the entire loop must be downed as new links are added. If a fibre optic or copper cable breaks or a transceiver fails, all cables and connectors between all devices must be examined to identify the offending link.

Hubs resolve these problems by collapsing the loop topology into a star configuration. Instead of connecting devices directly together, each device is connected to a port on a hub. The hub completes the connection from device to device. Since all devices are connected centrally to a hub, the hub becomes the focal point of additions or moves or changes to the network.

FIG. 7 shows the internal architecture of a conventional hub with four hub ports ($P_0$, $P_1$, $P_2$ and $P_3$) to which are connected three disks ($D_0$, $D_1$ and $D_2$) so that hub port $P_1$ has no disk connected to it. The main advantage of a hub is that each hub port comprises a port bypass circuit (PBC) or Loop Relay Circuit (LRC), shown in FIG. 7 as $PBC_0$, $PBC_1$, $PBC_2$ and $PBC_3$.

These circuits enable the fibre channel arbitrated loop (FC-AL) to be opened and closed and thereby dynamically reconfigured if a device is added or removed to the FC-AL. The PBC is comprised of a 2-input MUX and a switch connecting either one of the MUX inputs to the output. The MUXs in the PBCs are connected in sequence such that the output of each MUX acts as one of the inputs for the next MUX. The loop is completed by connecting the output of the final MUX in the hub ($MUX_3$) to the one of the inputs of the first MUX ($MUX_0$).

For example, looking at hub port $P_2$, it can be seen that the output of the MUX from the PBC of the preceding hub port, namely $MUX_1$, is transmitted both to hub port $P_2$ and to one of the inputs of $MUX_2$. On reaching P2, the output from MUX1 is transmitted to the connected device $D_1$. The response from $D_1$ is transmitted back through the hub port $P_2$ to the other input of $MUX_2$. In use, if a hub port (in this case P2), detects that a device is connected to it, then the switch (in this case S2) in the MUX (in this case MUX2) of the hub port's PBC (in this case PBC2) directly connects the response signal from the attached device (in this case D1) to the MUX output.

Looking at hub port $P_1$ for example, if however, a hub port detects that a device is not connected to it, or is not responding, the switch ($S_1$) is toggled so that it directly connects the input from the preceding MUX ($MUX_0$) to the output of its own MUX ($MUX_1$). This acts to close the associated PBC ($PBC_1$) and bypass the hub port ($P_1$) thereby allowing the loop to remain intact. This prevents a failing device or connection from bringing down the entire loop.

If it is desired to add a new device, at port $P_1$ for example, the loop opens automatically to add the new device without manual intervention, by toggling the position of the corresponding PBC switch ($S_1$). By this, the hub allows hot plugging; the ability to add and remove devices while the loop is active. In future versions of FC-AL, before a new device is allowed to be inserted in the loop, the hub will, at a minimum, verify valid signal quality. If a device exhibits poor signal quality or inappropriate clock speed, the associated PBC switch will remain toggled to bypass the hub-port, thereby allowing the other nodes on the loop to continue without disruption.

Arbitrated loop hubs may provide from 1 to 16 hub ports, with accommodation for more devices accomplished by cascading hubs together. A cascade is built by simply connecting a hub port of one hub to a hub port on the other, preferably with fibre optic cabling. In this way the total loop circumference is extended through additional hubs until the desired port count is reached.

However, such hubs have the disadvantage that the sequence of ports in the FC-AL through which a signal is transmitted is fixed by the internal wiring of the hub. Further such systems only allow the connection of one port to another thereby acting to include devices in the FC-AL.

Such hubs do not normally allow for branching type connections that would enable a device to sample information from the FC-AL without intervening in its activity. Also the activity of bypassing a loop in the hub introduces a delay into the loop traffic.

DISCLOSURE OF THE INVENTION

Accordingly, the present invention provides a hub for a fibre channel arbitrated loop, said hub comprising a switching device including a matrix of switches connected by a plurality of signal lines, each signal line being electrically connected to at least one switch, operable to selectively connect and disconnect one signal line from at least one other signal line, at least some of said signal lines being operatively connectable to respective devices comprising said fibre channel arbitrated loop, said switching device being operatively configurable to selectively open and close said switches to arrange said devices on said fibre-channel arbitrated loop.

Preferably, said plurality of signal lines is divided into a first sub-set and a second sub-set of signal lines, at least some of said first sub-set of signal lines being operatively connectable to respective input ports of devices comprising said fibre-channel arbitrated loop, and at least some of said second sub-set of signal lines being operatively connectable to respective output ports of devices comprising said fibre-channel arbitrated loop.

Preferably, said devices comprise a combination of storage devices and repeaters.

In a preferred embodiment, said switching device is configurable to operatively connect one of said second sub-set of signal lines to a fibre channel analyser.

Further preferably, said switching device is a cross-point switch.

In a further aspect there is provided a circuit board comprising the hub according to the invention, said circuit board including a plurality of tracks which in use connect at least some of said signal lines to a respective one of each of said devices comprising said fibre channel arbitrated loop. In a preferred embodiment, the circuit board is an enclosure services processor card adapted to plug into a backplane for a rack enclosure and said plurality of tracks terminate at an edge connector for connecting said card into said backplane. Alternatively, the circuit board is a backplane for a rack enclosure and said plurality of tracks terminate at respective edge connectors for connecting said backplane to said devices comprising said fibre channel arbitrated loop.

In a still further aspect, there is provided a rack enclosure comprising a backplane incorporating a hub according to the invention and a plurality of devices connected to said backplane forming a fibre channel arbitrated loop. Preferably, the hub is incorporated on one of said backplane or a card plugged into said backplane.

Preferably, said switching device is operatively connectable to an enclosure services processor, said processor being adapted to configure said switching device to arrange said devices on said fibre channel arbitrated loop and to connect said fibre channel analyser to said loop.

BRIEF DESCRIPTION OF THE DRAWINGS

The features and advantages of the present invention will become apparent from the following description of the invention, taken together with the accompanying drawings, in which.

DESCRIPTION OF THE PREFERRED EMBODIMENT

Figure 1:
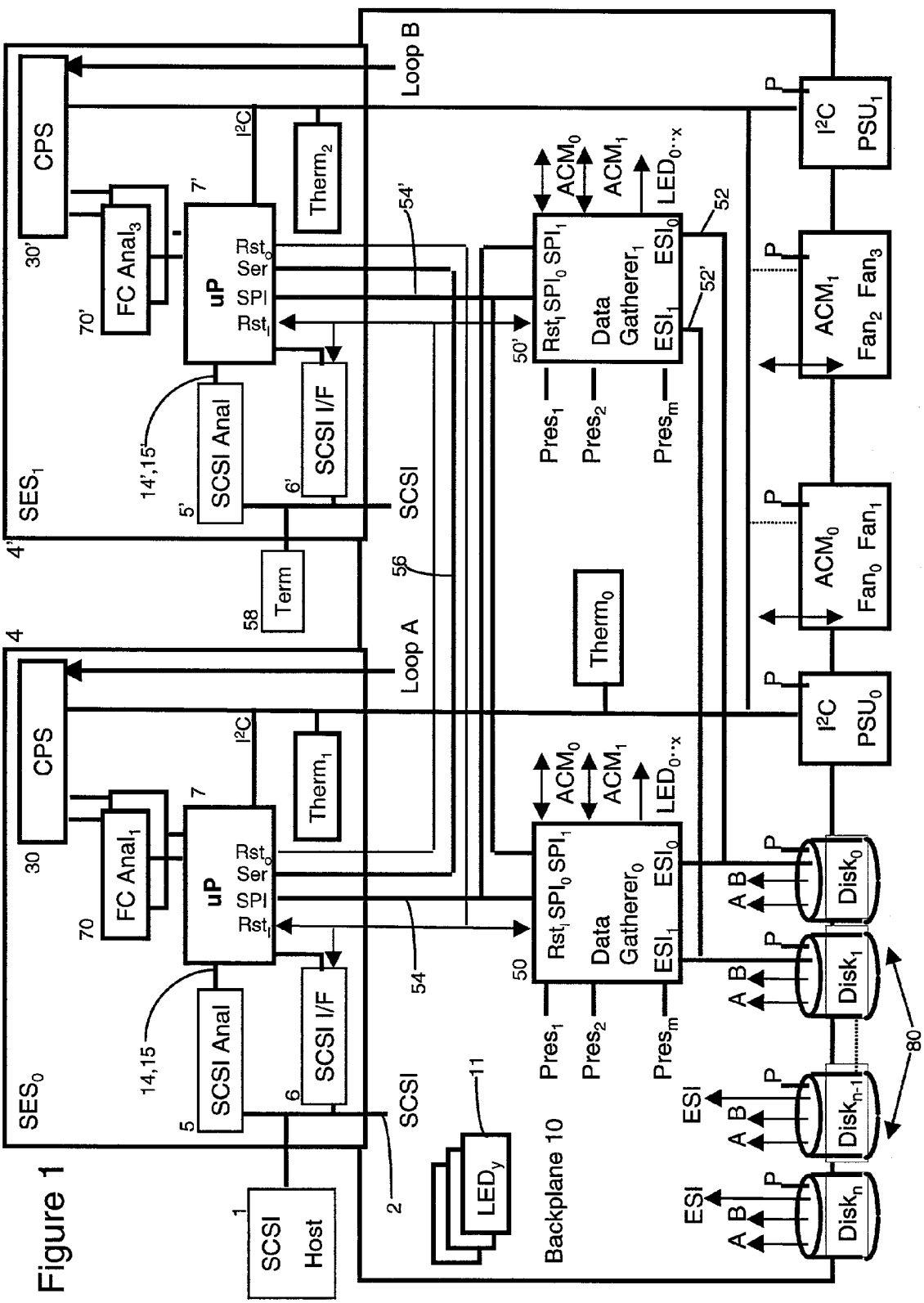
FIG. 1 is a block diagram showing a broad overview of a Fibre Channel Arbitrated Loop (FC-AL) Analyser and the manner in which it relates to other elements in an integrated data gathering system for a Fibre Channel Arbitrated Loop (FC-AL)

FIG. 1 is a block diagram showing a broad overview of a Fibre Channel Arbitrated Loop (FC-AL) and the manner in which it relates to other elements in an integrated data gathering system for the FC-AL. The overall operation of this system is described in co-pending application entitled "Data Gathering Device for a Rack Enclosure" naming Aedan Diarmid Cailean Coffey et al as inventors.

In the preferred embodiment, a plurality of disks (80) are housed in a rack and engage a back-plane (10) within the rack through edge-connectors (not shown). The disks are electrically and logically connected to form two FC-AL Loops A and B via respective hubs, each comprising a cross-point switch (also known as cross-bar switch) (30, 30') described later. The disks are then in turn configured to form a redundant array of independent disks (RAID) or Just a Bunch of Disks (JBOD).

A pair of FC-AL analysers (70, 70') are preferably located on each of pair of SCSI Enclosure Services (SES) processor boards (4, 4'), with each board being associated with one of Loops A or B. Nonetheless, the analysers may also be located on the back-plane (10) or wherever else in the integrated data gathering system as would enable the analyser to be on the FC-AL. The operation of both SES processor boards (4, 4') is identical and so reference will only be made in the present description to the board 4 and its components.

Again, the positioning of the analysers on the FC-AL is managed by the cross-point switch (30), however, it should be recognised that the analysers could also operate via a modified conventional type port-bypass circuit by sacrificing the benefits of using the cross-point switch, as explained below.

According to a preferred embodiment of the invention, the FC-AL analyser (70) serves as an adjunct to the SES Processor (7). The SES Processor (7) of the preferred embodiment provides online monitoring and control of variables predominantly associated with the enclosure environment (e.g. temperatures at different locations in the enclosure, fan speed, power supply voltages and currents and presence/absence of I/O controls, loop relay circuits and device drivers). Further details of the SES Processor (7) can be obtained in co-pending patent application entitled "Performance Monitoring in a Storage Enclosure" naming Aedan Diarmid Cailean Coffey et al as inventors.

In FIG. 1 it can be seen that the SES processor (7) is in bi-directional communication with disks (80) on the FC-AL, via one of a pair of Data Gatherer Chips (50, 50') through an Serial Peripheral Interface (SPI) bus (54) and an Enclosure Services Interface (ESI) bus (52) (also known as Small Form Factor SFF-8067). (Where data gatherer chips are not employed, the SES processor can connect directly to the ESI ports of the disks.)

Through communication between components of the FC-AL itself, communications from the SES processor (7) to FC-AL disks (80) are transmitted to a Host CPU (not shown) on the FC-AL. Further references to communication between the SES processor (7) and a host CPU will assume communication through the Data Gatherer Chip (50) and FC-AL disks (80) and will assume that the host CPU is a node on the FC-AL itself.

Since this operation of the analyser (70) involves the detection of transmission errors on a FC-AL, it is useful at this point to briefly review fibre channel (FC) transmission protocols, the FC-AL topology and the types of errors that occur in such systems.

The Open Systems Interconnection (OSI) model for FC is structured with 5 independent layers as follows;

FC-0 which defines the physical media and transmission rates

FC-1 which defines the transmission protocol including serial encoding and decoding rules, special characters, timing recovery and error control.

FC-2 which defines the framing protocol and flow control

FC-3 which defines the common services

FC-4 which defines the application interfaces that can execute over FC such as SCSI, IPI and IP.

From this it can be seen that the FC protocol does not have its own command set, but merely manages the data transfer between participating devices and thus inter-operates with existing upper-level protocols such as Small Computer System Interface (SCSI-3), Intelligent Peripheral Interface (IPI) and Internet Protocol (IP). Hence a complete analysis of a FC-AL could include a higher-level analysis of the SCSI protocol commands issued on the FC-AL network in addition to the lower-level analysis of the FC protocol.

Hence, the analyser 70 not solely limited to the analysis of FC characters, but can also be extended to include the analysis of SCSI commands on the FC-AL, by integrating the functionality of SCSI analyser (5) as described in related patent application number S2000/0709 entitled "Performance Monitoring in a Storage Enclosure" naming Aedan Diarmid Cailean Coffey et al as inventors (Attorney docket number PI 29276), with that of the FC-AL analyser (70).

Fibre Channel (FC) Components

Devices that can be accessed via FC are known as nodes. FC nodes have at least one port (known as an N-port) such ports can act as transmitters, receivers or both. The term NL_port is used to designate a N_port that can support arbitrated loop functions in addition to basic point-to-point functions. A node that initiates a transaction is known as an originator, the node that answers it is called a responder.

Fibre Channel (FC) Transmission Protocols

Before it is transmitted every byte of data is encoded into a 10 bit string known as a transmission character (using an 8B/10B encoding technique (U.S. Pat. No. 4486739)). Each un-encoded byte is accompanied by a control variable of value D or K, designating the status of the rest of the bytes in the transmission character as that of a data character or a special character respectively.

The encoding from an 8-bit data byte into a 10-bit code is achieved according to an 8B/10B-translation table and a running disparity calculated from a bit-stream. The running disparity is calculated as the number of ones minus the number of zeros sent in the bit-stream and is proportional to the DC level of the bit-stream. The 8B/10B-translation table includes two entries, corresponding to a positively or negatively valued running disparity for each 8-bit data byte. The entry is chosen to keep the running disparity for a given 8-bit data byte between +1 and −1 so that the DC balance is maintained near zero.

In general, the purpose of this encoding process is to ensure that there are sufficient transitions in the serial bit-stream to make clock recovery possible. The 8B/10B encoding technique supplies sufficient error detection and correction to permit use of low cost transceivers, as well as timing recovery methods to reduce the risk of radio frequency interference and ensure balanced, synchronised transmissions.

Whilst, every 8-bit data byte is encoded as a 10 bit transmission character according to this encoding process, there are however, many more possible 10 bit transmission characters than are needed to map to particular 8-bit data bytes. Only one of the remaining 10 bit encodings is of interest in this present description, namely the K28.5 transmission character. This character contains a "comma", a 7-bit string that cannot occur in any data transmission character (i.e. a transmission character corresponding to a data character) because of this, the K28.5 is used as a special control character.

As discussed above, the 8B/10B encoding technique provides a means of synchronisation to a received signal, however it also provides a means for error detection. Invalid transmission characters are transmission characters that have not been defined according to the 8B/10B-translation table. Invalid transmission characters also includes those transmission characters that are received or transmitted with an incorrect running disparity.

All information in FC is transmitted in groups of four transmission characters called transmission words (40 bits). Some transmission words have the K28.5 transmission character as their first transmission character and are called ordered sets. Ordered sets provide a synchronisation facility which complements the synchronisation facility provided by the 8B/10B encoding technique. Whilst phase locked loops (PLLs) enable synchronisation on the bit level with the assistance of the 8B/10B encoding technique, the responder also needs to synchronise with the originator at the 40 bit level. Ordered sets provide for both bit and word synchronisation. Such synchronisation establishes word boundary alignment, since the K28.5 transmission character can not be transmitted across the boundaries of any two adjacent ordered sets unless an error has occurred. Synchronisation is deemed to have occurred when the responder identifies the same transmission word boundary on the received bit-stream as that established by the originator.

Figure 2:
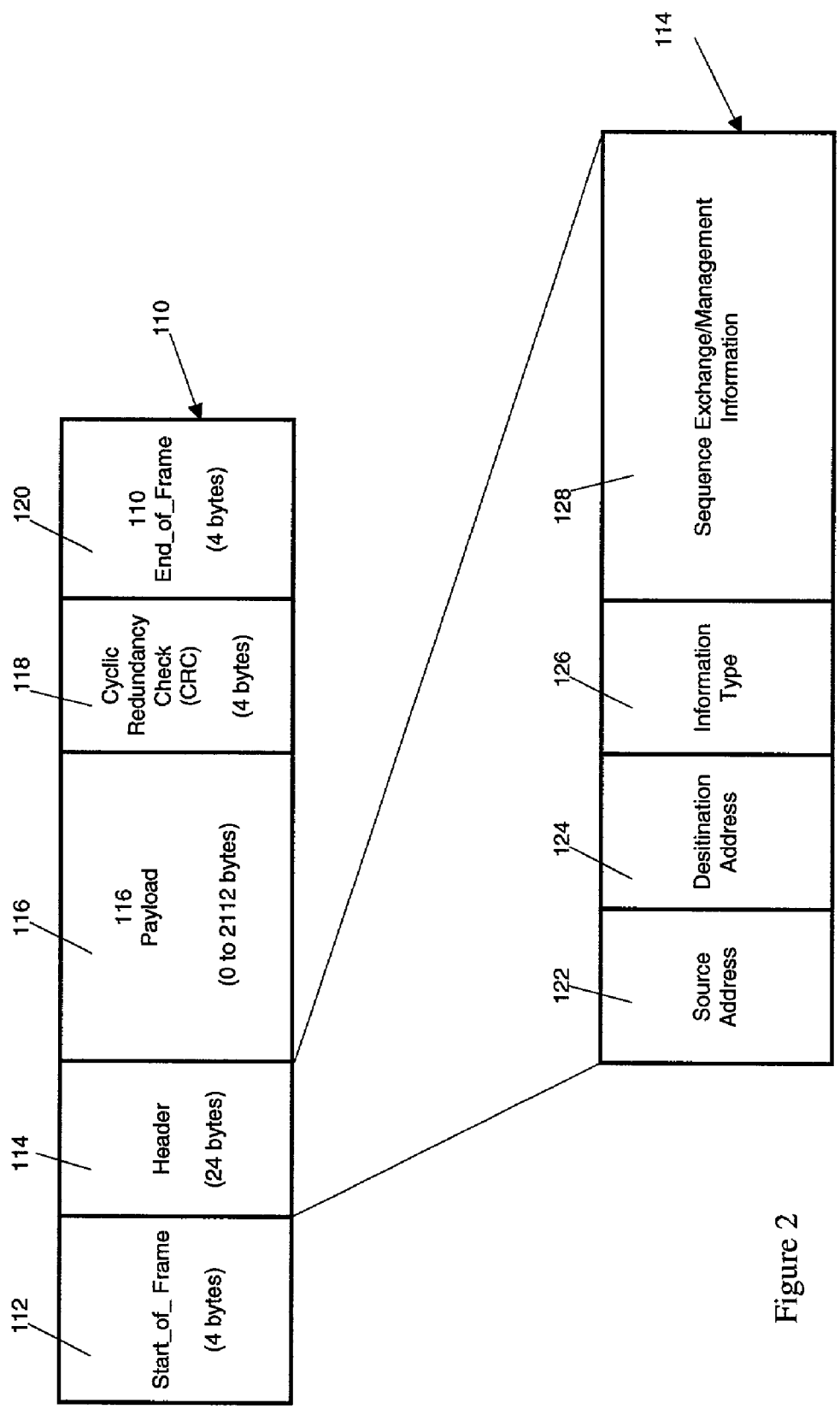
FIG. 2 is a block diagram of the components of a frame.

An ordered set may be a frame delimiter, a primitive signal or a primitive sequence. A frame delimiter includes one of a Start_of_Frame (SOF) or an End_of_Frame (EOF). These ordered sets immediately precede or follow the contents of a frame, their purpose is to mark the beginning and end of frames. Frames will be discussed in more detail below. Primitive signals are normally used to indicate events or actions. The set of primitive signals is comprised of the Idle and Receiver Ready (R_RDY) ordered sets. An Idle is a primitive signal transmitted continuously over the link when no data is being transmitted. The Idle is transmitted to maintain an active link over a fibre and enables the responder and originator to maintain bit, byte and word synchronisation. The R_RDY primitive signal indicates that an interface buffer is available for receiving further frames. Primitive sequences are used to indicate states or conditions and are normally transmitted continuously until something causes the current state to change. Such sequences include Offline (OLS), Not Operational (NOS), Link Reset (LR) and Link Reset Response (LRR), all of which are used in the process of initialising a link between two N-ports A frame is the smallest indivisible packet of information transmitted between two N_Ports. FIG. 2 shows a diagrammatic representation of a frame. A frame (110) is comprised of a Start_of_Frame (SOF) ordered set (112), a header (114), a payload (116), the Cyclic Redundancy Check (CRC) (118) and an End_of_Frame (EOF) ordered set (120). The header (114) contains information about the frame, including routing information (the source and destination addresses (122 and 124), the type of information contained in the payload (126) and sequence exchange/management information (128).

The payload (116) contains the actual data to be transmitted and can be of variable length between the limits of 0 and 2112 bytes. The CRC (118) is a 4-byte record used for detecting bit errors in the frame when received. The total size of a frame can be variable but must be an even multiple of four bytes so that partial transmission words are not sent. Individual frame sizes are transparent to software using the FC because the groups of one or more related frames responsible for a single operation are transmitted as a unit, such units being known as sequences.

Fibre Channel Arbitrated Loop (FC-AL)

FC-AL is a loop interconnection topology that allows up to 127 participating node ports (one of which can be a fabric loop port providing attachment to a switched fabric) to communicate with each other without the need for a separate switched fabric. Instead of a centralised approach to routing, the FC-AL distributes the routing function to each loop port.

Figure 3:
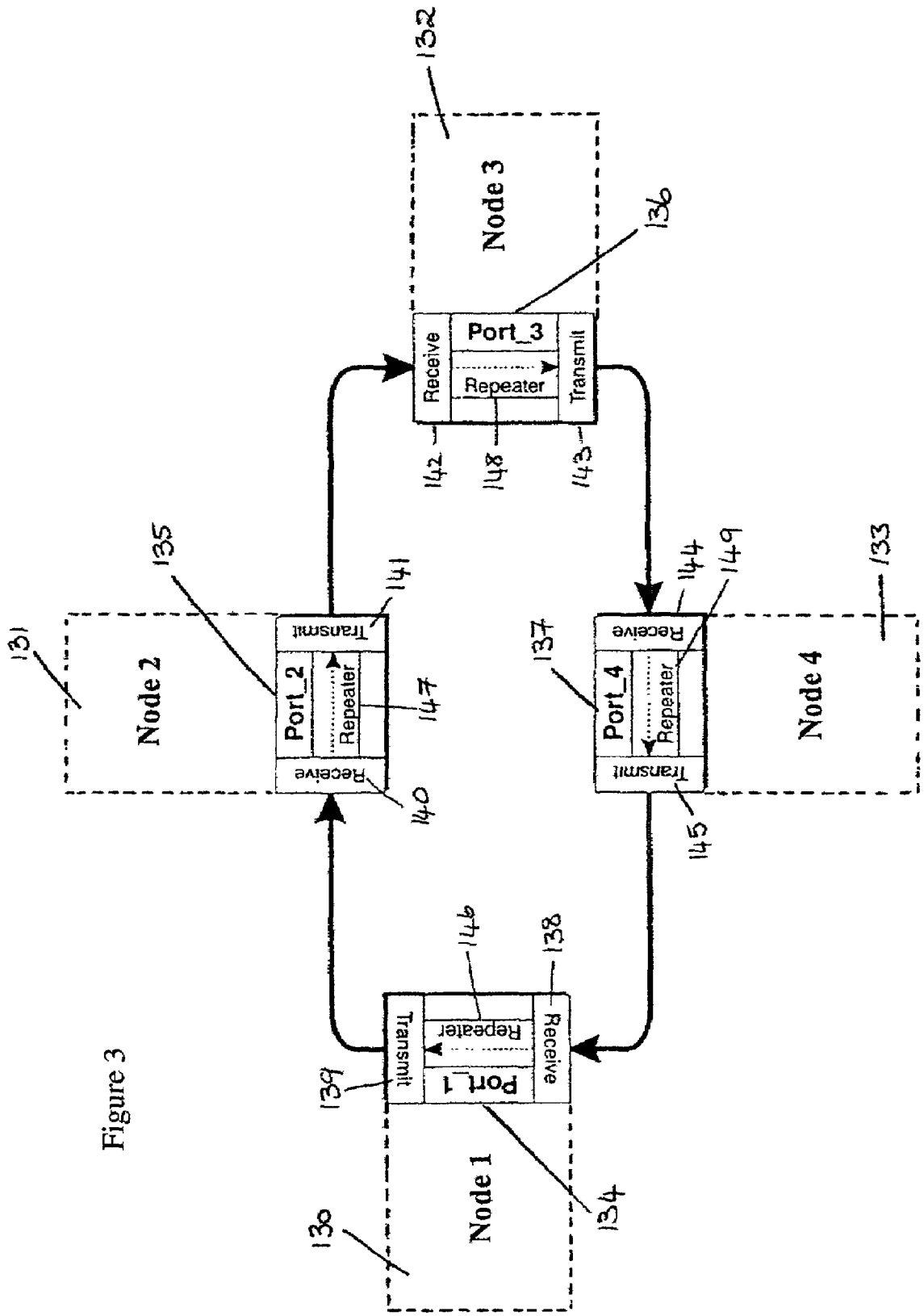
FIG. 3 is a block diagram of the components of a Fibre Channel Arbitrated Loop (FC-AL)

FIG. 3 shows a diagrammatic representation of a four node FC-AL. The FC-AL comprises four nodes (130, 131, 132 and 133) connected together via their ports (134, 135, 136 and 137). Information flows between the ports in a unidirectional fashion.

The arbitrated loop configuration is created by connecting a transmit output section of each port to a receive input section of the next loop port (e.g. connecting the transmit output section of Node 1 Port 1 (139) to the receive input section of Node 2 Port 2 (140)). Signal transmission continues through the remaining nodes on the FC-AL, until the signal reaches its designated responder. In other words, information from a given port (i.e. the originator) flows around the loop to its designated responder through each of the intermediate ports. Each port on the loop contains a repeater (146, 147, 148 and 149) allowing frames and ordered sets to pass through the port.

Loop-specific protocols are defined to control loop initialisation, arbitration and the opening and closing of loop circuits. These protocols use primitive signals and primitive sequences comprised of loop-specific ordered sets. The loop-specific ordered sets act as an addendum to those ordered sets previously defined by the Fibre Channel Standard, which have been specifically developed to implement the FC-AL protocols.

FC-AL does not add any new frame delimiter ordered sets. Additional Primitive Signals include those for arbitration (e.g. ARBX), clock synchronisation (e.g. SYNX), and opening (e.g. OPNy) and closing (CLS) communications between specific nodes. Additional Primitive Sequences include those for loop initialisation (LIP) and loop port bypass and enablement.

Operation of the FC-AL

Loop initialisation is used to initialise the loop, assign addresses to the ports on the loops, known as Arbitrated Loop Physical Address (AL_PA), and provide notification that the configuration may have changed. Loop initialisation is achieved by means of the Loop Initialisation Primitive (LIP) sequence and a series of loop initialisation frames. Any loop port on the loop is capable of starting loop initialisation by entering the initialising state and transmitting one of the LIP sequences.

The loop is a common resource shared by all loop ports. In order to ensure that information from one loop port does not interfere with information from another, each loop port must arbitrate for access to the loop and win arbitration before they transmit frames of their own on the loop. When a device is ready to transmit data, it arbitrates for access to the loop by transmitting the Arbitrate (ARBX) Primitive Signal, where x= the Arbitrated Loop Physical Address (AL_PA) of the device, which it then transmits to the next node in the loop.

If no other device wishes to transmit, the ARBX is transmitted around the loop through each node in turn, until it returns to the original arbitrating node. Once the node has received its own ARBX Primitive Signal it has gained control of the loop.

However, if more than one device on the loop is arbitrating at the same time, when an arbitrating device receives another device's ARBX, it compares the x value of the received ARBX (i.e. the AL_PA of the originator) with its own AL_PA. The device transmits the ARBX with the numerically lower AL_PA while the ARBX with the numerically larger AL_PA is blocked. Thus the device with the lower AL_PA will gain control of the loop first. Once that device relinquishes control of the loop, the other device will have another chance at arbitrating for control.

After a loop port has won arbitration (and hence has become an originator), it must then select a destination port (or a responder port) before sending frames to that port. This selection process is known as opening the destination port and uses the open (OPN) ordered set that the originator transmits to the responder. Once this happens, there essentially exists a point to point connection between the two devices. Only the originator and responder ports in the loop circuit are able to originate frame transmission. All the other devices in the loop between the originator and the responder device simply repeat the data.

As long as the loop circuit is active, the originator and responder ports have full use of the loop's bandwidth. Each loop may simultaneously transmit and receive data. When the two ports have completed communication with each other, the circuit is closed and the loop is made available for use by other ports.

FC-AL Errors (1) Link Errors

Link errors can occur during the transmission of the ordered sets used to implement the loop protocols. Most link errors will result in an 8B/10B error manifested as either an invalid transmission character or running disparity error. Some link errors may result in a valid but incorrect transmission character being decoded. If a node on an FC-AL receives an invalid transmission character while in the monitoring or arbitrating states, it substitutes any valid character for the invalid transmission character in order to create a valid word.

This behaviour introduces the possibility that a node could detect an invalid transmission character of an ordered set destined for another node and replace any transmission character in the ordered set with a different one. The substitution may result in an ordered set being unrecognisable by the receiving node. There is also the possibility that an ordered set could be transformed into a different valid ordered set, or that an AL_PA value in the ordered set could be transformed into a different AL_PA value.

If an ordered set is corrupted and unrecognisable, the action taken by a receiving node depends on the current state of the node. An invalid ordered set can be either retransmitted, discarded with the port continuing normal transmission with an appropriate fill word or another ordered set.

(2) Loop Protocol Errors

Loop Protocol Errors can occur as a result of lost ordered sets, incorrect ordered sets or unexpected ordered sets. A lost ordered set is one that is never recognised by its intended recipient. It could have been corrupted by a link error or due to a failure in the sending port. Lost ordered sets result in an expected action never occurring, an incorrect action occurring or the action occurring at the wrong port.

The errors can occur during any of the loop protocols, including arbitration, while opening or closing a loop circuit and during frame transmission or initialisation. For instance errors during the arbitration protocol may result in one or more ARB primitives being lost or corrupted.

(3) Other Errors

In addition to the errors that are unique to the FC-AL topology, the FC-AL environment is also subject to all of the normal errors that can occur in non-loop environments. A frame may be lost or misrouted if it is delivered to the wrong port or if the SOF delimiter is corrupted. A frame may contain a CRC error. A frame may also contain an invalid transmission word. An invalid transmission word is recognised by the responder when one of the following conditions is detected; an invalid transmission character is detected within a transmission word (in accordance with the 8B/10B-translation table), a special character alignment error is detected. (e.g., a K28.5 character is received as an odd-numbered character). In addition, errors can affect the flow control mechanisms using R_RDY and ACK ordered sets.

Figure 4:
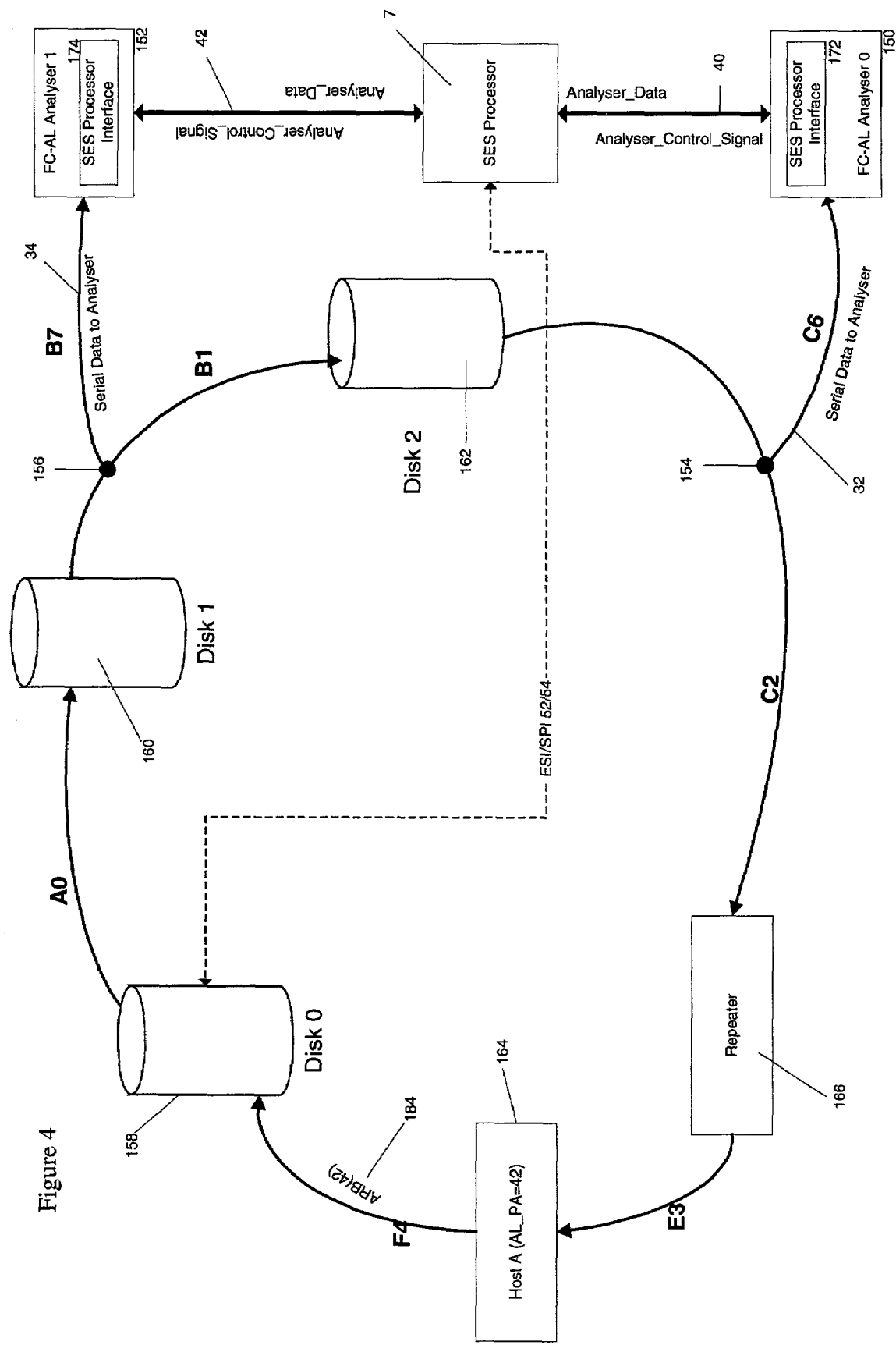
FIG. 4 is a diagram showing a broad overview of an example scenario showing how a Fibre Channel Arbitrated Loop (FC-AL) analyser might be used on a Fibre Channel Arbitrated Loop.

Turning now to the FC-AL analyser, FIG. 4 depicts a broad overview of an example scenario showing how the FC-AL analyser might be used on a Fibre Channel Arbitrated Loop. This diagram serves only to provide an example of an application of a FC-analyser and should in no way be construed as limiting the scope of the invention. FIG. 4 should be viewed in conjunction with FIG. 1 to observe how the simplified representation of the analysis of a FC-AL shown in FIG. 4, relates to the integrated data gathering system for a FC-AL shown in FIG. 1. FIG. 4 should also be viewed in conjunction with FIG. 5 to observe how the logical connections between the devices on the FC-AL shown in FIG. 4 are physically implemented in a cross-point switch (30).

Looking initially at FIG. 4, there are shown two FC-AL analysers, namely FC-AL Analyser 0 (150) and FC-AL Analyser 1 (152) corresponding to either the analysers 70 or 70' in FIG. 1. The analysers are connected to the FC-AL via branches from the loop at points (154) and (156) respectively. The FC-AL has five nodes therein, of which three are hard disks (Disk 0 (158), Disk 1 (160) and Disk 2 (162)). Of the remaining nodes one is a host CPU, Host A (164), with an AL_PA of 42 and the other is a repeater (166).

Figure 5:
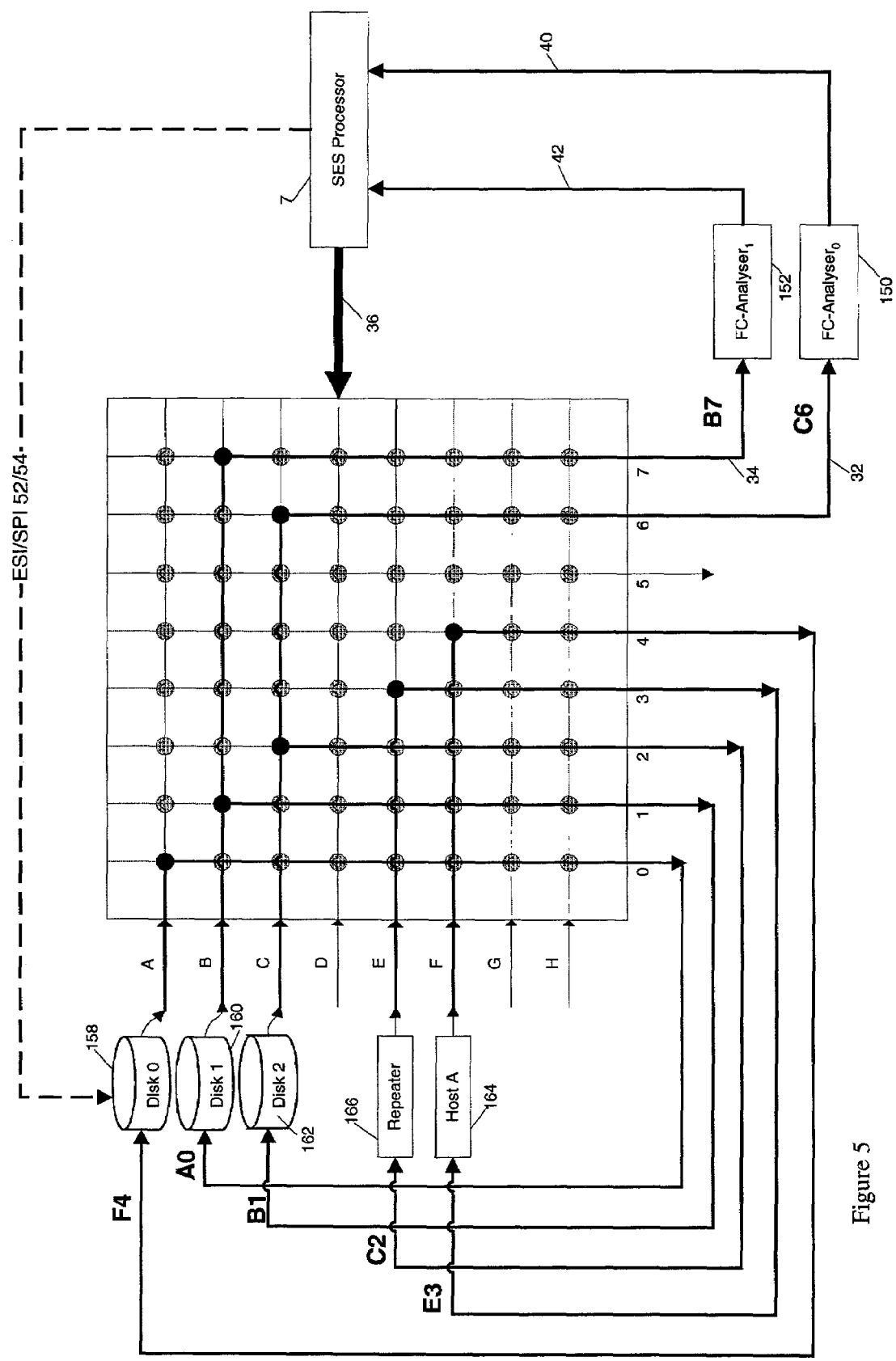
FIG. 5 is a more detailed diagram of the cross-point switch illustrated in FIG. 1 (A specific example of the manner in which it might be used is made with reference to the example scenario shown in FIG. 4)

The purpose of a repeater is as follows; while it is possible to transmit signals for considerable distances over coaxial cable without degradation, differences in impedance across connections between components leads to degradation of a signal and the necessity for repeaters to filter and amplify the signal. Since the disks in a FC-AL receive and actively transmit signals through their ports they effectively act as repeaters themselves. However, it is necessary to space the disks evenly about the FC-AL to achieve balanced signal repetition. In a FC-AL with few disks, it is necessary to supplement the repeating activity of the disks by means of additional repeaters. However, whilst repeaters act to improve the quality of a transmitted signal, they have the disadvantage of adding to the latency of the loop. Taking these two issues into account, the cross-point switch as will be described in FIG. 5, provides the facility for user configurable or automatic, arrangement and use of repeaters, in order to optimise the performance of the FC-AL.

As can be seen from above, a repeater basically takes the fibre channel signal and cleans up the edges but does not alter the timing. A retimer takes the signal in it's serial form, extracts the clock with a PLL (phase locked loop) and retransmits the data synchronised to a new, externally provided clock, thus removing jitter. A disk is a retimer, and both repeaters and retimers are available as standalone devices or embedded in other devices such as port bypass circuits.

Returning to FIG. 4, the two FC-AL analysers, (FC-AL Analyser 0 (150) and FC-AL Analyser 1 (152)) sample data from the FC-AL through their connection points (154 and 156). The data sampled from the FC-AL, by the two FC-AL analysers is shown in the diagram as Serial Data to Analyser (through connections C6 and B7 (32 and 34)).

The two FC-AL analysers, (FC-AL Analyser 0 (150) and FC-AL Analyser 1 (152)) are each equipped with a SCSI Enclosure Services (SES) Processor Interface (172 and 174 respectively). The SES Processor Interface (172 and 174) enables bi-directional communication between the FC-AL Analyser (150 and 152) and the SES Processor (7). Such bi-directional communications are comprised of configuration commands sent to a given FC-AL Analyser from the SES processor (7) (shown in the diagram as Analyser Control Signal) and performance-related data transmitted from the FC-AL analyser to the SES processor (7) (shown in the diagram as Analyser_Data). Communications between the FC-AL analysers (150 and 152) and the SES processor (7) are conducted through respective ESI busses (40 and 42). The methods for configuring the FC-AL analysers (150 and 152) will be described in further detail later in this section.

FIG. 4 also shows as an example, an ARB ordered set (184) transmitted from Host A (164) to the next node on the FC-AL, namely a Disk 0 (158). The presence of the ARB ordered set (184) indicates that Host A (164) desires to gain control of the FC-AL as described earlier.

Whilst a single FC-AL analyser (150 or 152) provides very detailed information concerning activity on the FC-AL at its connection point (154 or 156), the particular benefits of the embodiment become more evident on comparing the data from a multiplicity of such analysers.

In FIG. 4, a FC-AL with two FC-AL analysers (FC-AL Analyser 0 (150) and FC-AL Analyser 1 (152)) is shown. If, for example, on comparing the number of LIP ordered sets detected by both analysers, it is found that the number of LIP ordered sets detected by FC-AL Analyser 0 (150) is greater than that detected by FC-AL Analyser 1 (152), then such would indicate that Disk 2 (162) is likely to be a source of LIP ordered sets. Such in turn would indicate that Disk 2 (162) was out of synchronisation with respect to the rest of the components on the FC-AL.

FIG. 4 shows the logical connections between the devices in the specific example described above, however, FIG. 5 shows how these logical connections are implemented physically by means of a cross-point switch.

A cross-point switch (or cross-bar switch) (CPS) comprises a matrix of switches connected by signal lines, thereby creating a switching device with a fixed number of inputs and outputs. A CPS (30) can be constructed according to one of the following architectures:
(i) Concentration : more input lines than output lines
(ii) Expansion : more output lines than input lines
(iii)Connection : an equal number of input and output lines In the example given in FIG. 5, a CPS (30) with connection architecture (a square matrix of switches) is employed with 8 inputs and 8 outputs. It must be emphasised once again, that this diagram serves only as an example of an implementation of the CPS (30) and should in no way be considered as limiting the scope of the invention. The inputs to the CPS (30) are located on the left-hand side of the square matrix and are labelled with letters A to H from the top down. The outputs from the CPS (30) are located at the bottom of the square matrix and are labelled 0 to 9 running from left to right. At the intersection of each input and output line, there is provided a switched connection which, for the purposes of the present description, will be labelled with the letter and number of the input and output lines between which the switched connection can make or break a circuit. In FIG. 5, closed connections (switches) are shown as solid circles and open switches are shown as hashed circles. Solid lines are used to indicate a signal transmitted from a connected input device to a connected output device, whereas unused CPS input and output lines are shown as shaded lines.

A range of devices are connected to the inputs and outputs of the CPS (30), these devices correspond to the devices described earlier in relation to FIG. 4. The output of Disk 0 is connected to CPS input A, the output of Disk 1 is connected to CPS input B and the output of Disk 2 is connected to CPS input C. The output of the repeater (166) is connected to CPS input E and the output of Host A is connected to CPS input F, the other inputs to the CPS (D, G and H) remain unconnected.

Disk 1 receives its input from CPS output 0 via CPS connection A0 and Disk 2 receives its input from CPS output 1 via CPS connection B1. Further, the repeater (166) and Host A receive their inputs from CPS outputs 2 and 3 respectively, via CPS connections C2 and E3 respectively. Disk 0, FC-Analyser 0 (150) and FC-Analyser 1 (152) receive their inputs from CPS outputs 4, 6 and 7 via CPS connections F4, C6 (32 in FIG. 4) and B7 (34 in FIG. 4) respectively. The logical links in the FC-AL depicted in FIG. 4 are shown with the corresponding alphanumeric designation from the CPS connection loops shown in FIG. 5.

Looking at the FC-AL in FIG. 4, it can be seen that Host A (164) is logically connected to Disk 0 (158). This association is physically implemented in FIG. 5 by connecting the output from Host A on CPS input line F to CPS output line 4 through the fifth switch on CPS input line F. Similarly the logical connection between Disk 0 and Disk 1 in FIG. 4 is physically implemented in FIG. 5 by connecting the output from Disk 0 on CPS input line A to CPS output line 0 through the first switch on CPS input line A.

It can also be seen in FIG. 4 that Disk 1 is connected both to Disk 2 and FC-Analyser 1 (152). However, whilst Disk 2 is logically an element in the FC-AL, the FC-Analyser 1 (152) samples data from the FC-AL on a branching connection therefrom, without itself contributing to the latency of the FC-AL. Such connection structure is physically implemented in FIG. 5 by connecting the output voltage signal from Disk 1 on CPS input line B to the CPS output lines 1 and 7 through the second and eighth switches on the CPS input line B. The FC-Analyser 1 (152) is connected to the CPS output line 7 through the CPS connection loop B7 (34) and the Disk 2 is connected to the CPS output line 1 through the CPS connection loop B1 (188). However, whilst Disk 2 continues the FC-AL by transmitting its output to CPS input line C, the FC-Analyser 1 (152) transmits the results of its analyses directly to the SES processor (7) and thereby does not itself contribute to the loop delay on the FC-AL. From the SES processor (7), the results of the FC-AL analysis are processed and transmitted to a disk on the FC-AL via the Data Gatherer Chip (50) (shown in FIG. 1 but not in FIG. 4) through SPI and ESI busses ((54) and (52) in FIG. 1).

For the sake of brevity, the physical connections between the remaining nodes and FC-analyser for the FC-AL depicted in FIG. 4 will not be described here, but can be ascertained on examination of FIG. 5.

The SES processor (7) is also in bi-directional communication with any FC-analysers (70) (via 40 and/or 42) and unidirectional communication with the CPS (30) (via 36). The bi-directional link between the SES processor (7) and the host CPU (82), enables the SES processor (7) to transmit the results of any environmental monitoring or traffic analysis from the FC-AL analyser (70) to the host CPU (82). However, the bi-directional link also enables the host CPU (82) to issue configuration commands to the SES processor (7), which the SES processor (7) in turn transmits to the CPS (30) and/or the FC-AL analyser (70).

The communication links between the host CPU (82) and the FC-AL analyser (70) via the SES processor (7) allows the FC-AL analyser (70) to be programmed by the user to measure particular analytical variables relating to the performance of the FC-AL. Such user-configurable data acquisition is enabled by software, running on the host CPU (82), which packets the configuration requirements of the user into a form that can be interpreted byte SES processor (7) (e.g. configuration pages). On receiving this information the SES processor (7) determines the appropriate destination for the configuration commands and transmits it to the destination in the appropriate form.

Similarly, information from the FC-AL analyser (70) is transmitted to the SES processor (7) as, for example, a status page, and thence to Vision (or other similar software) on the host CPU (82) and displayed to the user in a more accessible format.

Communication between the host CPU (82) and the CPS (30) via the SES processor (7) allows the configuration of the on/off states of the different switches in the CPS matrix (30) to be programmed by the user. Such configuration of the CPS (30) thereby determines the connection sequence of nodes in the FC-AL and the structure and placement of the branching connections for FC-Analysers on the FC-AL. Configuration of the CPS (30) by the user is also enabled by software running on the host CPU (82) (for example Vision as described above).

Thus, on start-up, the system operates in an autonomous mode wherein any disks connected to the storage rack transmit a signal to the Data Gatherer Chip (50) on the Pres1-m lines, FIG. 1. This signal notifies the Data Gatherer Chip (50) of the presence of the connected disks and the SES processor (7) in turn obtains this information from the Data Gatherer Chip (50). (Alternatively, if data gatherer chips 50, 50' are not employed, the SES Processors could receive the present inputs P directly from the disks, although this would increase the cost of the edge connector required to bring the signals onto the SES processor board (4).) The SES Processor then informs the CPS (30) to make the appropriate connections to form the loop between the disks and host(s), and once the loop has been established, it is then possible for a user to configure the CPS (30) as desired both to re-order devices within the loop and to select the points at which the analysers connect to the loop.

The advantages of this method of connecting the FC-AL analyser (70) and FC-AL nodes via the CPS (30) is that firstly it is possible to for the user to selectively place the FC-AL analyser (70) on the FC-AL loop without contributing to the latency of the FC-AL. Whilst the process of reporting the results of the FC-AL analyser's analyses contributes to the traffic on the FC-AL, such contribution constitutes approximately 0.1% of the bandwidth of the FC-AL and as such is not significantly detrimental to the performance of the FC-AL.

Secondly, it is possible for the user to re-order the connections between the different FC-AL nodes a facility that is not available with a conventional port bypass circuit.

Further advantages include being able to build up to four loops within a shelf with no extra hardware, i.e. two on the A loop and two on the B loop. Also, private loops can be built to test specific drives offline. Also, if a RAID controller is plugged in to the rack, then separate host and drive loops can be created within the shelf.

Figure 6:
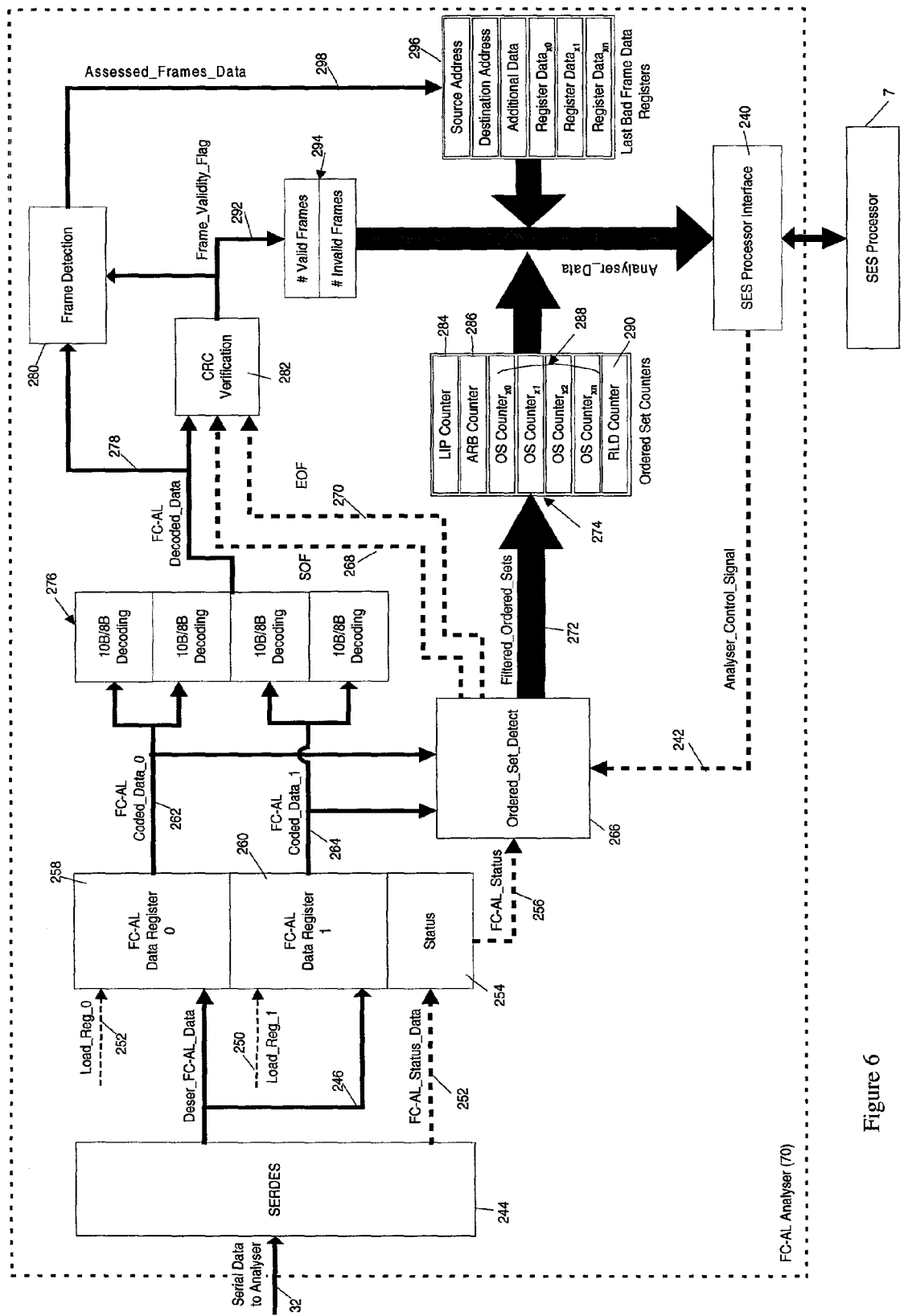
FIG. 6 is a detailed block diagram of the FC-AL analyser of FIG. 1.
Figure 7:
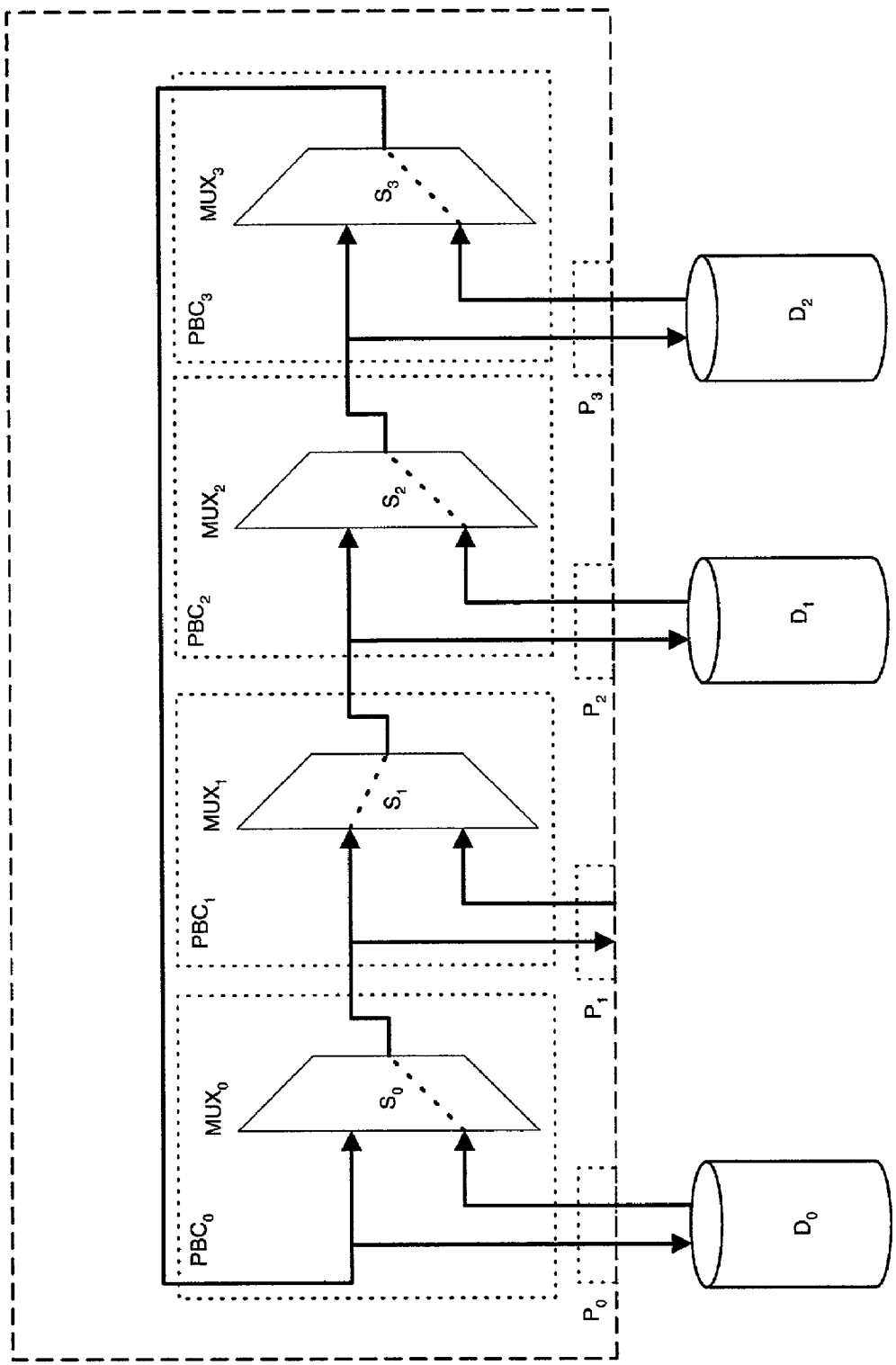
FIG. 7 is a diagram of a Fibre Channel Arbitrated Loop whose components are connected using a conventional hub comprising a plurality of port bypass circuits.

FIG. 6 shows a more detailed block diagram of the FC-AL analyser (70) itself. Serial data on the FC-AL (shown in FIG. 4 as Serial Data to Analyser (32)) is transmitted to a serialiser-deserialiser (SERDES) (244). In the embodiment shown, the SERDES (244) employed is a Vitesse 7126. However, it should be recognised that the scope of the invention is not limited to a particular SERDES (244). The SERDES (244) samples the received serial data (32). The sampled data is re-timed by the SERDES (244) according to an internal clock. The internal clock is phase-locked to the received serial data (32) (further details can be obtained from Vitesse Data Sheet VSC7126).

The SERDES (244) has two outputs in this embodiment. To generate the first output, the re-timed data is deserialised into two 10-bit characters. The two 10 bit characters are concatenated to form a 20 bit character and output onto a 20 bit data bus as Deser_FC-AL_Data (246). To generate the second output, the SERDES (244) detects FC comma characters in the sampled serial data (32). The detected comma is output on a separate bus from the deserialised data as FC-AL_Status_Data. (252). The FC-AL_Status_Data (252) is stored in a status register (254) and output as FC-AL_Status (256). The component of the embodiment to which this data is transmitted will be discussed later in the description.

Returning to the Deser_FC-AL_Data (246), consecutive characters on the 20 bit wide bus are stored in one of two data registers, namely FC_AL Data Register 0 (258) and FC-AL Data Register 1 (260). The FC-AL Data Register 0 (258) and FC-AL Data Register 1 (260) each have another input, namely control signals on a Load_Reg_0 (248) line and a Load_Reg_1 (250) line respectively. Such signals act to enable and disable the ability of a given register to accept an input. Such signals thereby determine to which of the two registers a given character from the Deser_FC-AL_Data (246) is transmitted. However, in this embodiment the FC-AL Data Register 0 (258) and FC-AL Data Register 1 (260) take alternate turns in accepting characters from the Deser_FC-AL_Data (246).

The FC-AL Data Register 0 (258) and FC-AL Data Register 1 (260) have one output each, along which they output their 20 bit characters as FC-AL Coded_Data_0 (262) and FC-AL Coded_Data_1 (264) respectively. These two outputs are transmitted together to two, separate detection modules, namely an ordered set detection module and a 10B/8B decoding module.

Looking at the first of these modules, namely the ordered set detection module, this module is shown as an Ordered_Set_Detect block (266) in FIG. 6. This module serves to detect ordered sets in data sampled from the FC-AL. The ordered set detection module (266) also performs runlength checking.

Whilst the Ordered_Set_Detect block (266) supports the detection of a pre-defined set of commonly occurring ordered sets, it is also a user programmable component, enabling the user to specify particular ordered sets to be detected. Such configuration commands are transmitted to the Ordered_Set_Detect block (266) by the SES Processor (7) via the SES Processor Interface (240). The configuration commands are depicted in FIG. 5 as an Analyser_Control_Signal (242).

The Ordered_Set_Detect block (266) also has as an input, the output signal from the status register (254) namely the FC-AL_Status (256). Such input enables the Ordered_Set_Detect block (266) to serve as a means of status checking and K28.5 detection.

Having detected and identified specific ordered sets, the Ordered_Set_Detect block (266) produces three outputs, namely, SOF (268), EOF (270) and Filtered_Ordered_Sets (272). Looking at the first two of these outputs (i.e. SOF (268) and EOF(270)), the Start_of_Frame (SOF) ordered set (112) and End_of_Frame (EOF) ordered set (120) are isolated from a given set of ordered sets which had been detected and identified by the Ordered_Set_Detect block (266). The isolated ordered sets are then transmitted to a CRC Verification Block (282) along the SOF (268) line for the Start_of_Frame ordered sets (112) and EOF (270) line for the End_of_Frame ordered sets (120). This description will return to the CRC Verification Block (282) later.

We return now to the third output from the Ordered_Set_Detect block (266), namely the Filtered_Ordered_Sets (272). Following the isolation of the Start_of_Frame (SOF) and End_of_Frame (EOF) ordered sets, the Filtered_Ordered_Sets (272) output is used to transmit the remaining ordered sets detected and identified by the Ordered_Set_Detect block (266) to a set of ordered set counters (274). The ordered set counters (274) will be described later in the description.

Turning now to the second module to which the FC-AL Data Register 0 (258) and FC-AL Data Register 1 (260) transmit their outputs, this is shown in the diagram as a module comprised of four 10B/8B Decoding blocks (276). The purpose of the 10B/8B Decoding blocks (276) is to decode the 40 bits characters received from the FC-AL Data Registers (258 and 260) (i.e. FC-AL Coded_Data 0 (262) and FC-AL Coded Data 1 (264)) into 32 bit characters. Such decoding is performed in accordance with the inverse of the 8B/10B encoding scheme described earlier. The resulting 32 bit characters are output from the 10B/8B decoding blocks along a single bus (shown as FC-AL Decoded_Data (278) in FIG. 6) to two further modules, namely the CRC Verification Block (282) and a Frame Detection Block (280)). Each of these modules will be discussed in greater detail later in the description.

Returning to the ordered set counters (274), the LIP counters (284), ARB counters (286) enumerate the number of occurrences of these common ordered sets over a period of time. Further, in correspondence with the facility for user-programmable, specific ordered set detection provided by the Ordered_Set_Detect block (266) as described above, the ordered set counters (274) also count the occurrences of the user specified ordered sets. Such counters are depicted as OS counters x0-xn (288) in FIG. 6.

The ordered set counters (274) will also count the number of occurrences of Run Length Disparities (RLDs) in the RLD counter (290). An RLD is used as an indicator of lack of synchronisation but is not strictly an ordered set. The ordered set counters (274) have one output which is transmitted to the SES processor (7) via the SES processor interface (240).

Returning now to the CRC Verification Block (282), it will be recalled that this block has three inputs, SOF (268), EOF (270) and FC-AL Decoded_Data (278). The CRC Verification Block (282) uses the information from the CRC (118) part of the frame so delimited, to enable error detection in the associated frame. The validity or invalidity of a frame as detected by the CRC Verification Block (282) is flagged as such by the CRC Verification Block (282) and output as a Frame_Validity_Flag (292). The Frame_Validity_Flag (292) is transmitted to two separate modules namely the Frame Detection Block (280) and a block of counters for the number of occurrences of valid and invalid frames (294) over a period of time. The data from the number of valid frames and number of invalid frames counters (294) are output to the SES processor (7) via the SES processor interface (240).

Returning to the Frame Detection Block (280), it will be recalled that this block has two inputs, namely the Frame_Validity_Flag (292) and the FC-AL Decoded Data (278). The Frame Detection Block (280) isolates header information such as source address, destination address etc. from a frame. If the CRC Verification Block (282) flags that the associated frame was invalid via the Frame_Validity_Flag (292) signal, then the information isolated in the Frame Detection Block (280) is transmitted to a block of registers, namely the Last Bad Frame Data Registers (296) as Assessed_Frames_Data (298). In the Last Bad Frame Data Registers (296) individual isolated frame attributes are written to their corresponding register (e.g. source address etc.). However, if the CRC Verification Block (282) flags that the associated frame was valid, then the information isolated in the Frame Detection Block (280) is discarded.

The data contained in the Last Bad Frame Data Registers (296) are output to the SES processor (7) via the SES processor interface (240). However, if the data received by the FC-AL analyser is of very poor quality (i.e. with a high rate of invalid frames) it is possible that received frames may be recognised as invalid faster than it is possible for the SES processor (7) to read the data from the Last Bad Frame Data Registers (296). In such circumstance, the number of invalid frames counter (294) will continue incrementing itself in response to the recognised bad frames. However, in order to reduce the risk of overwriting data in the Last Bad Frame Data Registers (296), the Last Bad Frame Data Registers (296) are such that it is not possible to write more information to them until their current contents have been read by the SES processor (7). For example the Last Bad Frame Data Registers (296) comprises a sample and hold component, with a sampling rate matching the rate at which the SES processor (7) can recover the data from the Last Bad Frame Data Registers (296). Hence if frames are being recognised as being invalid faster than the SES processor (7) can read the header data from the Last Bad Frame Data Registers (296), the Last Bad Frame Data Registers (296) will only hold data from the last invalid frame detected by the CRC Verification Block (282).

In summary, the FC-AL analyser accepts as input, data from the FC-AL and configuration commands from the SES processor (7) and outputs to the SES processor (7) the information from the ordered set counters (274), the Last Bad Frame Data Registers (296) and the number of valid and invalid frames counters (294).

Where the SES processor (7) receives information from more than one analyser (70) on a loop, it can then collate this information and even make a diagnosis of a problem on the loop, before reporting this problem to a host application.

The invention claimed is:

1. A fibre channel arbitrated loop apparatus, the apparatus comprising:
   a matrix of switches having N fibre channel inputs and M fibre channel outputs,
   the matrix comprising N×M switches, each of the switches associated with a respective one of the N fibre channel inputs and with a respective one of the M fibre channel outputs, the switches disposed such that any one of the N fibre channel inputs can be connected with any one of the M fibre channel outputs by closure of a particular one of the N×M switches,
   configuration means communicatively coupled with the switches, said means bringing about, for at least one of the N fibre channel inputs, the closing at the same time of at least two switches associated therewith, whereby at least two of the M fibre channel outputs are both connected with the at least one of the N fibre channel inputs, the apparatus further comprising:
   a first fibre channel device having a fibre channel input and a fibre channel output, the fibre channel output of the device connected with a first one of the N fibre channel inputs of the matrix of switches, the fibre channel input of the device connected with a first one of the M fibre channel outputs of the matrix of switches,
   a second fibre channel device having a fibre channel input and a fibre channel output, the fibre channel output of the device connected with a second one of the N fibre channel inputs of the matrix of switches, the fibre channel input of the device connected with a second one of the M fibre channel outputs of the matrix of switches,
   a fibre channel analyser having a fibre channel input, the fibre channel input of the analyzer connected with a third one of the M fibre channel outputs of the matrix of switches,
   and the switches of the matrix disposed such that the first one of the N fibre channel inputs is connected to the second one of the M fibre channel outputs and is also connected with the third one of the M fibre channel outputs.

2. A method for use with with a fibre channel arbitrated loop and a matrix of switches having N fibre channel inputs and M fibre channel outputs, the matrix comprising N×M switches, each of the switches associated with a respective one of the N fibre channel inputs and with a respective one of the M fibre channel outputs, the switches disposed such that any one of the N fibre channel inputs can be connected with any one of the M fibre channel outputs by closure of a particular one of the N×M switches, the method comprising the steps of:
   for a first one of the N fibre channel inputs, closing a first one of the switches associated therewith,
   closing a second one of the switches associated with the first one of the N fibre channel inputs,
   and a first one of the M fibre channel outputs is connected with the first one of the N fibre channel inputs and a second one of the M fibre channel outputs is connected with the first one of the N fibre channel inputs, the method further comprising the steps of:
   connecting an input of a fibre channel analyser to the second one of the M fibre channel outputs.

3. The method of claim 2, performed with respect to first and second fibre channel devices each having a fibre channel input and a fibre channel output, the method further comprising the steps of:
- connecting the output of the first fibre channel device to the first one of the N fibre channel inputs;
- connecting the input of the first fibre channel device to a second one of the N fibre channel outputs;
- connecting the output of the second fibre channel device to a second one of the N fibre channel inputs;
- connecting the input of the second fibre channel device to a third one of the N fibre channel outputs;
- whereby any fibre channel data that is output by the first fibre channel device is communicated both to the input of the second fibre channel device and to the input of the fibre channel analyzer, and the connection of the fibre channel analyser does not contribute to any latency in the connection from the first fibre channel device to the second fibre channel device.

* * * * *